United States Patent [19]

Gendron

[11] 4,197,033
[45] Apr. 8, 1980

[54] METHOD OF INSTALLING A PIPELINE

[75] Inventor: George J. Gendron, Houston, Tex.

[73] Assignee: Raymond International Builders, Inc., Houston, Tex.

[21] Appl. No.: 880,283

[22] Filed: Feb. 22, 1978

[51] Int. Cl.² .............................................. B63B 35/02
[52] U.S. Cl. .................................................... 405/170
[58] Field of Search ................. 61/110, 111, 105, 724, 61/50; 405/158, 159, 169, 170, 229

[56] References Cited

U.S. PATENT DOCUMENTS

| 3,099,911 | 8/1963 | Turzillo | 61/50 X |
| 3,656,309 | 4/1972 | Bultema | 61/111 |
| 3,657,786 | 4/1972 | Wiswell, Jr. | 61/111 |
| 4,063,429 | 12/1977 | Wilson | 61/105 |

FOREIGN PATENT DOCUMENTS

| 750132 | 1/1967 | Canada | 61/50 |
| 1136178 | 12/1968 | United Kingdom | 61/50 |

Primary Examiner—Mervin Stein
Attorney, Agent, or Firm—Fitzpatrick, Cella, Harper & Scinto

[57] ABSTRACT

A pipeline is installed by forming a ground surface below the desired grade of the pipeline, holding a pipe length at the desired grade while injecting a hardenable fluid material into a bag positioned between the pipe length and the underlying ground surface so that after the material hardens the bag provides a temporary support for the pipe length at the proper grade and thereafter installing a permanent support by placing hard granular material between the remainder of the underside of the pipe length and the underlying ground surface.

7 Claims, 5 Drawing Figures

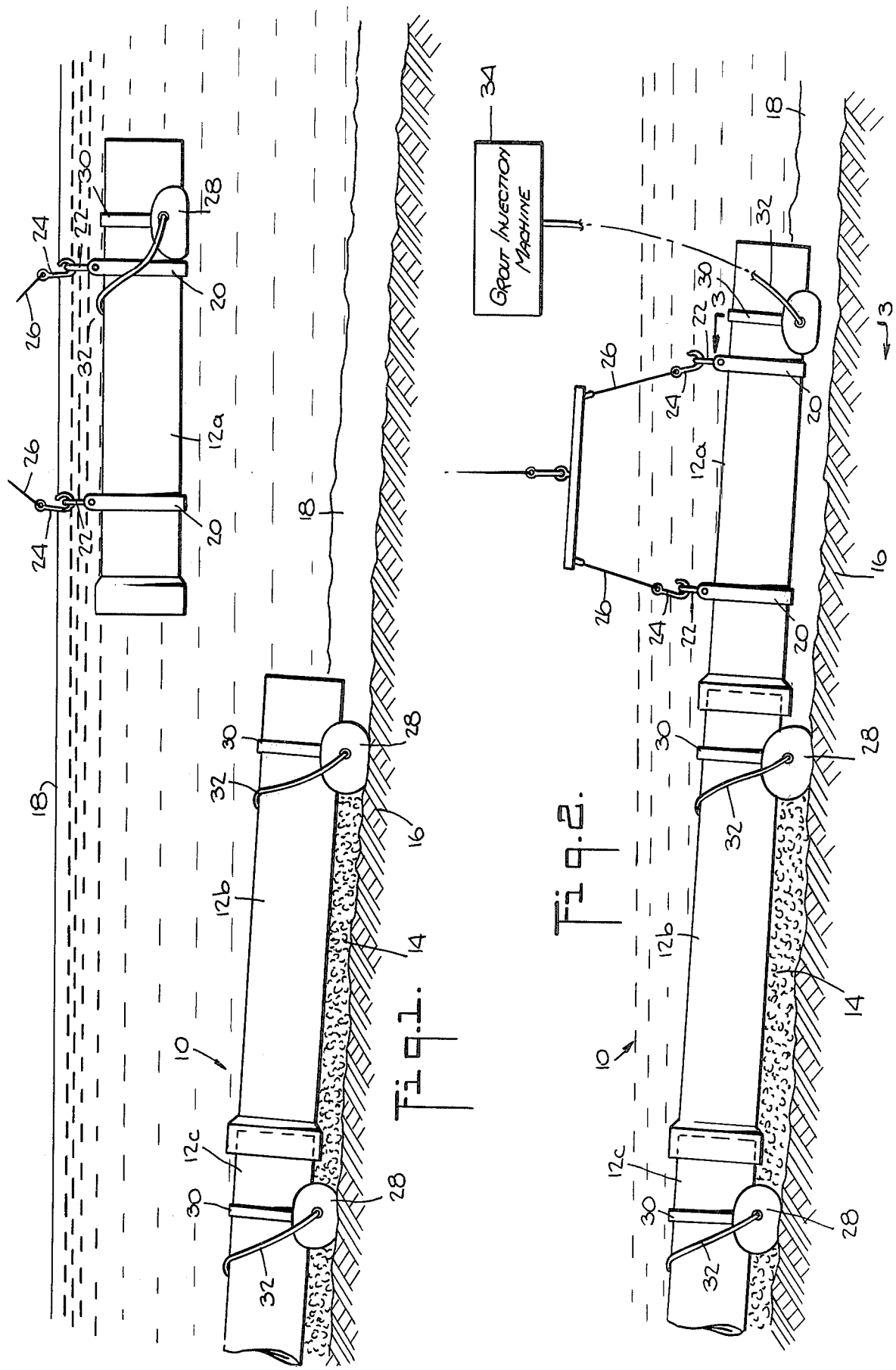

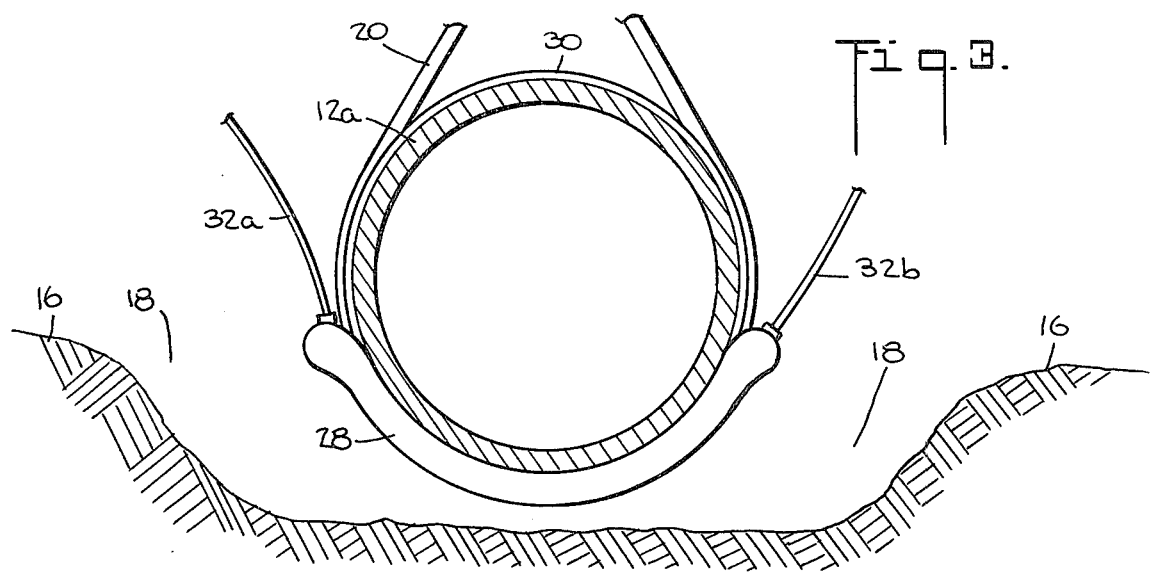
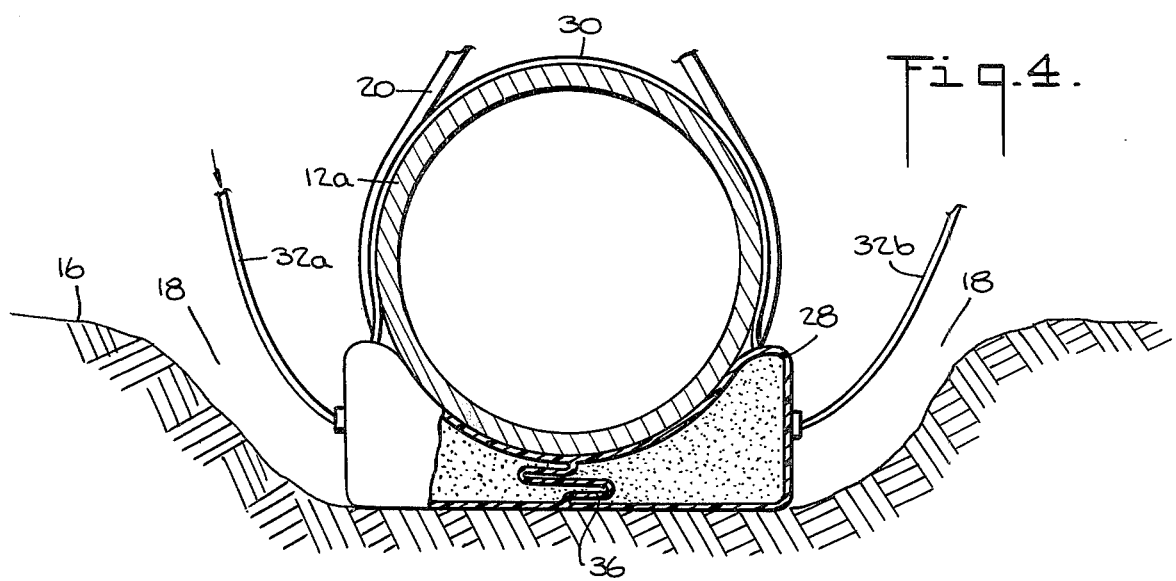
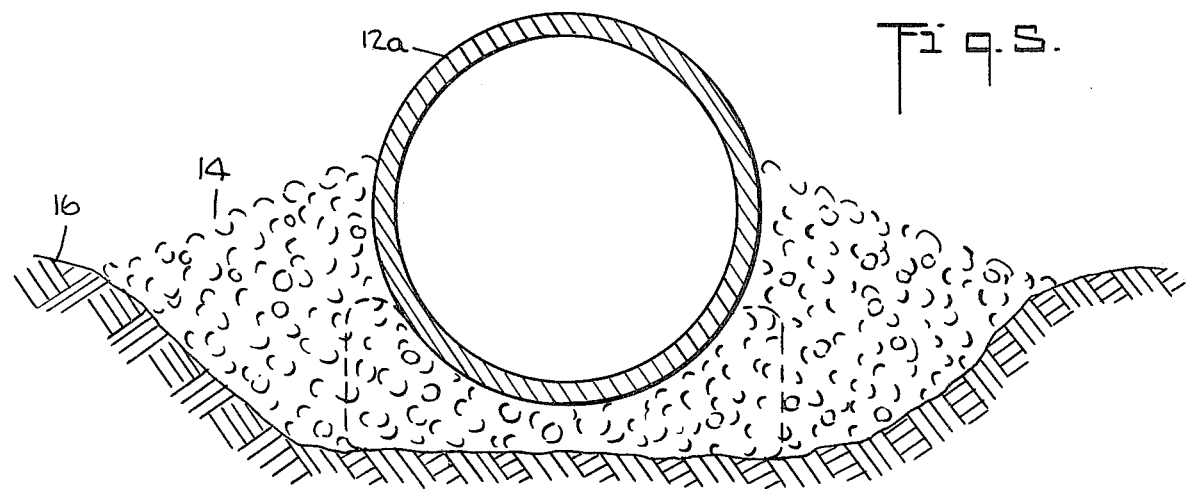

METHOD OF INSTALLING A PIPELINE

BACKGROUND OF THE INVENTION

1. Field of the Invention

This invention relates to pipeline construction and more particularly it concerns a novel method for permanently installing large diameter pipeline along a predetermined grade.

2. Description of the Prior Art

The present invention is particularly suited to the installation of large diameter, gravity flow pipelines such as outflows, sewer lines, etc., many of which must be located under water near a shore line. In the past these pipelines, which are made up of a series of interconnected lengths of pipe, have been installed by first trenching the path along which the pipeline is to be installed, installing a layer of granular support material, such as gravel, in the trench, grading the support material to the desired final grade of the pipeline, and thereafter positioning each length of pipe with one end adjacent the end of a previously installed length of pipe on the thus graded support material. This technique proved unsatisfactory because it was difficult to provide precise grading of the support material, especially where the pipeline was to be installed under water. According to an alternative technique, preformed saddles were installed and set to desired grade level to serve as temporary supports. The pipe lengths were then set on these temporary supports and were thus held in place until a permanent support bed was installed. This technique, however, proved to be unsatisfactory because the saddles were expensive to manufacture and install.

The prior art also shows various other pipeline support techniques. For example, U.S. Pat. No. 3,734,138 to B. T. Brown et al and U.S. Pat. No. 3,861,158 to J. W. Swain et al show the use of flexible bags filled with a hardenable material and positioned at different locations along a pipeline to provide vertical support. These techniques, however, only provide point support at spaced apart locations along a pipeline. They are designed for the purpose of supporting a pipeline while allowing it to flex, to a certain degree, either at or between the supports. Because of this, these prior art techniques cannot provide the continuous firm support which is needed in a large diameter gravity type pipeline system. In a gravity type pipeline it is important that the pipeline follow a gentle yet continuous slope from inlet to outflow so that the materials passing through it can flow in an unobstructed fashion to the end of the line. If the line should flex or move in a vertical direction at any point along its length, the gravity flow will be impaired. Thus, where a large diameter gravity type line is to be installed it is especially important that the line be supported continuously along its length so as to ensure that the large weight of the fluids passing through it do not allow it to flex in the vertical direction.

SUMMARY OF THE INVENTION

The present invention provides a novel method for installing large diameter continuously supported gravity flow pipelines in an economical and efficient manner. According to the present invention the ground surface along which the pipeline is to be installed is cleared so that at every location its surface lies below the elevation of the pipeline grade. Each length of pipe to be installed is positioned in succession along the pipeline path with one end in connecting relationship to the end of a previously installed pipe length. Hardenable fluid material, such as a quick setting cement or grout, is pumped into one or more flexible walled bags located between the pipe length and the underlying ground. The pipe length is held in position and the hardenable material is maintained under pressure until it sets to provide temporary supporting strength. The crane or derrick which was used to bring the length of pipe into position may then be taken away for other use and thereafter a granular supportative backfill material is installed under the pipe and between the inflated bags to provide permanent support along the length of the pipeline.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other arrangements or modifications for carrying out the several purposes of the invention. It is important, therefore, that the claims be regarded as including such equivalent arrangements or modifications as do not depart from the spirit and scope of the invention.

BRIEF DESCRIPTION OF THE DRAWINGS

Certain specific arrangements for carrying out the invention have been chosen for purposes of illustration and description, and are shown in the accompanying drawings, forming a part of the specification wherein:

FIG. 1 is an elevational view, illustrating a partially installed pipeline and illustrating an installation step according to the present invention;

FIG. 2 is a view similar to FIG. 1 but showing a successive installation step;

FIG. 3 is a cross section view taken along line 3—3 of FIG. 2;

FIG. 4 is a view similar to FIG. 3 and illustrating a further installation step; and FIG. 5 is a view similar to FIG. 3 and illustrating a final installation step.

DETAILED DESCRIPTION OF THE PREFERRED EMBODIMENT

As shown in FIG. 1 an outfall pipeline 10 installed according to the present invention, comprises a series of individual pipe lengths 12a, 12b, etc., connected together end to end and supported on a bed 14 of granular material such as gravel. Outfall pipelines are often used to discharge fluids to an offshore location and accordingly, as shown in FIG. 1 a substantial portion of their length extends along a sea bed 16 which may be at a depth of from twelve to sixty feet (3.7 to 12.3 meters) beneath a water surface 18.

The piepline 10 is typically of large diameter, e.g. seven feet (2 meters); and the pipe lengths 12 themselves, which are usually made of precast concrete, may each be forty feet (12 meters) in length and may weigh about fifteen tons (13.6 metric tons).

Fluids are carried through the pipeline 10 by gravity and accordingly the pipeline is set on a grade characterized by a small but finite pitch angle and extending downwardly toward its discharge end. It is important that the downward pitch be continuous throughout the length of the pipeline in order to maintain continuous fluid flow. At the same time the pitch angle should be small so that the difference in elevation between the inlet and discharge ends of the pipeline is not excessive. Accordingly, each of the pipe lengths 12 must be positioned very precisely during installation of the pipeline and the pipe lengths must be supported securely in such position.

In the past, it had been difficult to prepare the supporting bed 14 at a proper grade and with a proper pitch to support the pipeline 10 as above described, especially where the large, heavy pipe lengths 12 were being installed under water. These difficulties are overcome by the installation technique of the present invention described herein.

As shown in FIG. 1 the ground over which the pipeline to be laid (i.e. in the present case, the sea bed 16) is dredged to form a shallow trench 18 along the path over which the pipelin is to extend. This trench should follow the pitch of the pipeline and it should extend along a grade about eighteen inches (46 cm.) below the bottom surface of the pipeline. It is not important that this trench be dredged with substantial precision because the supporting bed 14 will accommodate irregularities or unevenness to a large extent.

After the trench 18 is formed, but before the supporting bed 14 is installed, a pipe length 12a is lowered down into position adjacent a previously installed pipe length 12b. The pipe length 12a is held in a harness, which may comprise a pair of slings 20 extending around the pipe length near each end, lifting eyes 22 which hold the ends of the slings together and grapple hooks 24 which engage the lifting eyes. The grapple hooks 24 extend down from lift lines 26 which are controlled and supported by means of a crane or other suitable lifting and lowering machinery.

Before the pipe length 12a is lowered it is provided with at least one inflatable support bag 28 positioned adjacent its lower surface and held in place by means of a strap 30 extending around the pipe length. The bag 28 is preferably of a strong woven fabric such as nylon and is preferably of generally tubular configuration in its inflated state with its longitudinal axis extending transversely to the longitudinal axis of the pipe length 12a. Where the pipe length 12a is of the size and weight described above, the bag 28 should have a length of about ten feet (3 meters) and a diameter of about three feet (1 meter). Also, it is preferred that the portion of the bag 28 in immediate contact with the pipe length 12a, be cut and sewn to a saddle shape so that it readily conforms to the pipe length surface. This will serve to distribute and minimize pressures within the bag.

At least one grout supply conduit 32 is fitted to the bag 28 and this conduit extends up to a grout injection machine 34 (FIG. 2) located on a suitable barge (not shown) or on shore. The bag 28 is otherwise closed.

While the pipe length 12a is being lowered into position as shown in FIGS. 1 and 2, the bar 28 is collapsed as shown in FIG. 3. After the pipe length has been brought into position, the grout injection machine 34 is activated to force grout or other hardenable cementitious material into the bag 28 to inflate the bag. As the bag inflates it expands and fills the space between the lower surface of the pipe length and the underlying ground as shown in FIG. 4. The injection is continued until the pipe length just begins to rise or until its weight is taken off the slings 20. At this point grout injection is terminated but grout pressure is maintained until the grout hardens to a degree sufficient to support the weight of the empty pipe length. Fast setting grouts (e.g. sold under the trademark SIROC) are available which will attain this degree of hardness in about fifteen minutes.

Because the bag 28 is flexible and because it is filled with a fluid material during grout injection, the bag will conform to the surface variations of the bottom of the trench 18 and will accommodate itself to the distance between the actual grade of the trench and the desired grade of the pipe length. Thus, after the grout or other material has hardened in the bag, the bag will provide a precise temporary support to hold the pipe length 12a in proper position and orientation until installation of the permanent supporting bed 14.

After the material in the bag 28 has hardened the slings 20 are released and removed from the pipe length 12a. Thereafter, while the pipe length is temporarily supported by the grout filled bag 28, the permanent supporting bed 14 is installed by pouring hard granular material into the trench 18 and around the bottom of the pipe and the bag 28 as shown in FIG. 5. This granular material, which may be sand or gravel, for example, may be tamped into place to eliminate voids under the pipe length and to provide a stable base for supporting the pipeline. Although the grout filled bags 28 serve essentially as temporary supports for the pipe length 12a prior to installation of the permanent supporting bed 14, they do not interfere with the permanent supporting bed and therefore they may be left in place when the permanent supporting bed is installed.

After the pipe length 12a has been installed as above described, successive pipe lengths may be installed in similar manner. The permanent supporting bed 14 may be installed under each previously installed pipe length simultaneously with the installation of successive pipe lengths so that the various steps of trenching, pipe length installation and premanent supporting bed installation can be carried out at different locations at the same time.

According to one modification of the above described pipeline installation procedure the pipe length 12a (FIG. 2) may be lowered to a position two or three inches (5–7.5 cm.) below desired grade, and the grout injected into the bag 28 may be forced in with sufficient pressure to lift the pipe length to its final elevation. If the pipe length and bag are of the size, weight and dimensions given herein by way of example, a grout injection pressure of about fourteen pounds per square inch (1 kg/cm$^2$) would suffice to raise the pipe length in this manner.

FIG. 4 shows a longitudinal web 36 extending internally of the bag 28 and dividing the interior of the bag into two laterally separated compartments 28a and 28b, each of which is provided with its own individual grout supply conduit 32a and 32b. This arrangement permits selective inflation of the bag 28 so that greater lifting forces may be imposed on one side of the pipe length 12a than on the other side. In this manner the pipe length may be moved slightly to the left or to the right to bring it precisely to proper alignment before the permanent support bed 14 is installed. This selective inflation can be carried out by selective control of grout flow through the supply conduits 32a and 32b.

It will be appreciated that the present invention may be used to install larger or smaller diameter pipelines than that described herein; and that while a single bag was shown to be used with each pipe length, two or more similar bags may also be used.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed and desired to be secured by Letters Patent is:

1. A method of installing a pipeline, made up of a plurality of pipe lengths, to extend along a predetermined path and to follow a precise grade, said method comprising the steps of forming a ground surface below said grade and along said path, positioning a pipe length along said path and at said grade, selectively injecting a hardenable substance under pressure into separate internal compartments of a flexible walled bag arranged between the pipe length and the underlying ground surface, controlling the flow of said substance into said compartments to move said pipe length to the left or to the right to bring it precisely into proper alignment with other pipe lengths along said path and holding said pipe length while said substance hardens and provides a temporary support for said pipe length, thereafter, and in succession, similarly positioning and temporarily supporting additional pipe lengths along said path and following said grade, and, after the substance has hardened in said bags, filling in the spaces between said bags, the lengths of pipe supported thereby and the underlying ground surface with a granular supporting backfill material to provide a permanent support for said pipeline.

2. A method according to claim 1 wherein said method is carried out under water.

3. A method according to claim 1 wherein said bag is held to said pipe length during the positioning thereof.

4. A method according to claim 1 wherein said hardenable substance is injected at sufficient pressure to position said pipe length.

5. A method according to claim 1 wherein said supporting material is installed under previously positioned and temporarily supported pipe lengths while subsequent pipe lengths are positioned and temporarily supported.

6. A method according to claim 2 wherein said ground surface is formed by dredging a trench along the path of said pipeline.

7. A method according to claim 1 wherein said bag is formed with a saddle shape adjacent the surface of said pipe length to distribute and minimize pressure within said bag.

* * * * *